United States Patent
Sauer et al.

(10) Patent No.: US 9,951,211 B2
(45) Date of Patent: Apr. 24, 2018

(54) HEAT-CURABLE RUBBER COMPOSITIONS HAVING PLASTISOL-LIKE RHEOLOGICAL PROPERTIES

(71) Applicant: Henkel AG & Co. KGaA, Duesseldorf (DE)

(72) Inventors: Ralf Sauer, St. Leon-Rot (DE); Peter Born, Sandhausen (DE); Karin Weidenauer, Heidelberg (DE)

(73) Assignee: Henkel AG & Co. KGaA, Duesseldorf (DE)

(*) Notice: Subject to any disclaimer, the term of this patent is extended or adjusted under 35 U.S.C. 154(b) by 0 days.

(21) Appl. No.: 15/183,953

(22) Filed: Jun. 16, 2016

(65) Prior Publication Data

US 2016/0289431 A1   Oct. 6, 2016

Related U.S. Application Data

(63) Continuation of application No. PCT/EP2014/078162, filed on Dec. 17, 2014.

(30) Foreign Application Priority Data

Dec. 18, 2013 (DE) .......... 10 2013 226 505

(51) Int. Cl.
*C08L 9/00* (2006.01)
*C09D 109/00* (2006.01)
*C09J 5/00* (2006.01)
*C09J 109/00* (2006.01)

(52) U.S. Cl.
CPC .............. *C08L 9/00* (2013.01); *C09D 109/00* (2013.01); *C09J 5/00* (2013.01); *C09J 109/00* (2013.01); *C08L 2205/025* (2013.01); *C08L 2205/03* (2013.01); *C08L 2207/324* (2013.01); *C09J 2409/00* (2013.01)

(58) Field of Classification Search
CPC .. C08L 9/00; C08L 2205/025; C08L 2205/03; C08L 2207/324; C09D 109/00; C09J 5/00; C09J 109/00; C09J 2409/00
See application file for complete search history.

(56) References Cited

U.S. PATENT DOCUMENTS

| | | | |
|---|---|---|---|
| 6,004,425 A | 12/1999 | Born et al. | |
| 6,448,338 B1 | 9/2002 | Born et al. | |
| 6,620,873 B2 * | 9/2003 | Nakano et al. | C08J 3/226 524/424 |
| 8,415,418 B2 | 4/2013 | Kohlstrung et al. | |
| 8,436,105 B2 | 5/2013 | Kohlstrung et al. | |
| 2004/0052951 A1 | 3/2004 | Sauer et al. | |
| 2009/0036595 A1 | 2/2009 | Kohlstrung et al. | |
| 2011/0233479 A1 | 9/2011 | Korzhenko et al. | |
| 2013/0289183 A1 | 10/2013 | Kerns et al. | |

FOREIGN PATENT DOCUMENTS

| | | |
|---|---|---|
| CA | 2000569 A1 | 4/1990 |
| CA | 2198773 A | 3/1996 |
| DE | 3834818 C1 | 11/1989 |
| DE | 102006016577 A1 | 10/2007 |
| DE | 102007029644 A1 | 1/2009 |
| DE | 102009026824 A1 | 12/2010 |
| DE | 102009028607 A1 | 2/2011 |
| EP | 0097394 B1 | 10/1986 |
| EP | 0309903 B1 | 12/1991 |
| EP | 0441244 B1 | 5/1994 |
| JP | H10505373 A | 5/1998 |
| JP | 2013231177 A | 11/2013 |
| WO | 9623040 A1 | 8/1996 |
| WO | 9903946 A1 | 1/1999 |
| WO | 0248255 A2 | 6/2002 |

OTHER PUBLICATIONS

International Search Report for International PCT Patent Application No. PCT/EP2014/078162 dated Mar. 30, 2015.

* cited by examiner

*Primary Examiner* — Nathan M Nutter
(74) *Attorney, Agent, or Firm* — James E. Piotrowski

(57) ABSTRACT

The invention relates to heat-curing reactive compositions based on natural and/or synthetic liquid elastomers containing olefinic double bonds and on vulcanizing agents, where these comprise a quantity, relative to the entire composition, of from 1 to 25% by weight, preferably from 1 to 15% by weight, of at least one liquid polyisoprene, preferably at least one cis-1,4 polyisoprene; a quantity, relative to the entire composition, of from 0.5 to 10% by weight, preferably from 0.5 to 5% by weight, of at least one functionalized liquid polybutadiene; a quantity, relative to the entire composition, of up to 40% by weight, preferably from 1 to 25% by weight, of a triglyceride fraction, the distribution of fatty acid in which comprises a proportion of at least 5% by weight, more particularly at least 60% by weight, of one or more omega-3 fatty acids and/or one or more omega-6 fatty acids; and at least one vulcanizing agent, where the proportion, relative to the entire composition, of synthetic polymers having at least one C=C double bond and/or at least one C≡C triple bond is at least 7.5% by weight, preferably 9% by weight. These have plastisol-like rheology and therefore can be applied at room temperature by conventional spray systems. The invention also relates to use of same as sealant composition or as coating composition, and to methods for bonding components and/or sealing joints between components and/or coating components with use of the compositions.

20 Claims, No Drawings

HEAT-CURABLE RUBBER COMPOSITIONS HAVING PLASTISOL-LIKE RHEOLOGICAL PROPERTIES

The invention relates to heat-curable compositions based on liquid rubbers having plastisol-like rheological properties, to the use thereof in the automotive paint field, and to a method for coating, sealing, or bonding components in vehicle paint shops.

The coating or sealing of sheet metal parts in vehicle construction, in particular on bodies of automobiles, is frequently carried out on cataphoretic paint (KTL)-coated sheet metal parts. The seam sealing and coating compounds used in this process are cured later in the paint drying ovens. Prior to that, the parts to be bonded or sealed pass through cleaning, phosphating, and dip prime coating stages. The treatment agents used in these stages can cause the adhesives or sealants to be rinsed out of the adhesive joints. So as to meet these demands, various procedures have become known, such as thermal/inductive pre-curing of low-viscosity, pasty adhesives/sealants, the use of adhesives in the form of solvent-containing compositions or hot-melt adhesives, as 2-component products, or else as moldings, which are generally manually applied and at the time of application have inherent tack. These moldings may be present in ribbon or round cord form, or as stampings, or as profiles having any arbitrary cross-section.

Low-viscosity, pasty coating compounds can be used particularly easily when using spraying applications or flat-stream applications, or else extrusion, which is why such products are also used very frequently in the automotive paint field, in particular if they are based on plastisols.

Plastisols are generally understood to mean dispersions of organic polymers in plasticizers that gel on heating to relatively high temperatures and cure on cooling. Plastisols widely used in practice today predominantly contain finely powdered polyvinyl chloride (PVC), which is dispersed in a liquid plasticizer and forms a paste. Such polyvinyl chloride plastisols can be used for a wide variety of purposes. They are used, among other things, as sealants, such as for sealing seams in metal containers or as flanged seam adhesives in the metal industry, as anti-corrosion coatings for metals (for example as underbody protection for motor vehicles), for impregnating and coating substrates made of textile materials (such as carpet backing coating), as cable insulations and the like). Plastisols based on fine powdered methacrylate copolymers (PMMA) or styrene copolymers are also known. Such plastisols, in particular based on PVC or PMMA, are also used to a great extent in automobile manufacturing. They are used to line reinforcing structures such as engine hoods, trunk lids, doors, roof systems, and for flanged seam bonding and sealing seams from other joining processes. The use of plastisols for these application purposes has the advantage that they have favorable rheological properties, in particular at room temperature. So as to ensure washing resistance in the various cleaning, phospating and dip prime coating stages in the production of the automobile bodies, these plastisol compositions are frequently partially gelled in a pre-gelling process to such a degree that the viscosity thereof is high enough to ensure these washing resistance properties and initial strength of the components.

In addition to the above-mentioned advantages, plastisol compositions, however, have a number of serious drawbacks; the aging stability of the same, for example, exhibits great weaknesses, resulting in a loss of quality due to corrosion and, associated therewith, a loss of adhesion. In particular, it has been found that the plastisols used in the body-in-white can tend to absorb moisture. The latter is particularly significant for components that were only pre-gelled and then either have to be temporarily stored for a longer period of time or transported to remote production locations. Furthermore, they exhibit certain weaknesses in the aging stability following the VDA cyclic corrosion test and salt spray test according to DIN 50021. In addition, the storage stability of such plastisol compositions also offers room for improvement since, on occasion, they tend to separate the disperse and liquid phases. In addition, they tend to "set"; which is to say when stored for long periods, the material becomes so highly viscous, probably due to agglomeration processes, that it first has to be subjected to a high degree of shear before application, in order to convert it back into the low-viscosity, sprayable state. In addition, plastisol compositions are very sensitive with regard to the maximum storage temperature; in any event, they have to be stored below 40° C. because otherwise partial gelling of the plastisol takes place. In addition, cured plastisols also have a thermoplastic character, which is to say the strength thereof is greatly restricted at elevated temperatures, so they cannot be used for structural adhesive bonds.

Another serious drawback, which is gaining increasing importance, is the fact that the customarily used plastisols are based on plasticizers, which are not cross-linked with the polymer matrix and are therefore emitted from the compositions over an extended period. These plasticizer emissions are not advantageous for a variety of reasons. It would therefore be desirable to have alternative compositions available, which have the favorable progressive of plastisol compositions, which is to say in particular sufficiently low viscosity so as to ensure sprayability at room temperature and high elasticity in the cured state.

Of late, compositions based on vulcanizable rubber mixtures have therefore been increasingly proposed as alternative adhesives or sealants and sealing compounds (EP 0 097 394 B1, DE 3834818 C, EP 0 441 244 B1, EP 0 309 903 B1, WO 96/23040, WO99/03946, WO 02/48255 A2).

While the rubber compositions of the above-mentioned related art are generally very well-suited for use in bodies-in-white in automobile manufacturing, they also have outstanding properties in terms of the washing resistance, the aging stability and the required technical properties. A key disadvantage of these rubber masses, however, is the very viscosity of the same, so that they can generally only be applied by way of pumping in the warm state. They cannot be applied using conventional spray methods, such as the airless method. A further disadvantage is the higher costs of such formulations. Finally, of late there has been a growing need to also formulate sealing and coating compounds based on natural and/or renewable resources.

It was therefore the object of the present invention to develop heat-curable compositions that, with respect to the applicability and the mechanical properties thereof, are comparable to plastisol compositions or known compositions based on liquid rubbers, yet overcome the known disadvantages. In particular, the object was to provide compositions that have the viscosity of conventional plastisol compositions and thus can be processed like these, but are free of plasticizers and solvents, and that, compared to known rubber compositions, are more cost-effective and have a higher content of natural and/or renewable resources and lower viscosity. Furthermore, the compositions were to have mechanical properties that are comparable to the presently used compositions.

Surprisingly, it was found that the desired properties can be achieved by a heat-curable composition based on vegetable oils, based on natural and/or synthetic liquid elastomers containing olefinic double bonds, and based on vulcanizing agents. These systems are characterized by good applicability and outstanding mechanical properties in the cured stated. During hot cross-linking (vulcanization), rubber-like tack-free elastomer structures are created from the systems according to the invention.

The present invention accordingly relates to heat-curable reactive compositions, comprising
- (a) at least one liquid polyisoprene, preferably at least one cis-1,4-polyisoprene, in an amount of 1 to 25 wt. %, preferably 1 to 15 wt. %, and in particular 3 to 10 wt. %, based on the total composition;
- (b) at least one functionalized liquid polybutadiene in an amount of 0.1 to 10 wt. %, preferably 0.5 to 10 wt. %, preferably 0.5 to 5 wt. %, and in particular 0.5 to 3 wt. %, based on the total composition;
- (c) a triglyceride fraction, the fatty acid distribution of which includes at least 5 wt. %, in particular at least 60 wt. %, of one or more omega-3 fatty acid(s) and/or one or more omega-6 fatty acids, in an amount of 1 to 40 wt. %, preferably 1 to 25 wt. %, and in particular 5 to 25 wt. %, based on the total composition; and
- (d) at least one vulcanizing agent;

wherein the content of synthetic polymers having at least one C═C double bond and/or at least one C≡C triple bond is at least 7.5 wt. %, and preferably 9 wt. %, based on the total composition.

The present invention further relates to the use of these heat-curable reactive compositions as a sealant, sealing compound or coating compound, in particular in automobile paint shops.

The present invention further relates to a method, in particular in a vehicle paint shop, for joining components and/or for sealing joints between components, in particular for sealing coarse and/or fine seams or coating the underbody, comprising the following essential method steps:
- a) applying the aforementioned composition to at least one component, in particular by way of spraying or extruding;
- b) joining the components, optionally followed by (spot) welding, flanging, bolting and/or riveting; and
- c) heating the components so as to cure the composition, optionally with mechanical fixation of the components.

The present invention moreover relates to a method for coating components, the method comprising:
- a) spraying a composition according to the invention on the surface of the component; and
- b) heating the coated component so as to cure the composition.

The term "liquid" as used herein refers to the state of aggregation at room temperature, which is to say at 20° C., and shall be understood to mean that the product can be poured from the container under the influence of gravity at 20° C.

"At least one," as used herein, denotes 1 or more, which is to say 1, 2, 3, 4, 5, 6, 7, 8, 9, or more. With respect to an ingredient, the expression refers to the type of the ingredient and not to the absolute number of the molecules. "At least one liquid polyisoprene" thus, for example, denotes at least one type of liquid polyisoprene, which is to say that one type of liquid polyisoprene or a mixture of several different liquid polyisoprenes may be used. Together with weight information, the expression refers to all compounds of the described type that are present in the composition/mixture, which is to say that, beyond the indicated amounts of the corresponding compounds, the composition does not include any further compounds of this type.

All percentages provided in connection with the compositions described herein refer to wt. %, in each case based on the composition in question, unless explicitly indicated otherwise.

To the extent that the present application references molecular weights, the information refers to the weight average molecular weight, which is to say the $M_w$ value, unless indicated otherwise. The molecular weight can be determined by way of GPC, wherein calibration takes place against a polystyrene standard.

The compositions according to the invention are preferably free of solid rubbers, which is to say rubbers having a molecular weight of 100000 or higher. It is further preferred for the compositions of the invention to be liquid.

In various embodiments of the invention, the at least one liquid polyisoprene comprises one or more liquid cis-1,4-polyisoprenes having a molecular weight between 10000 and 70000, preferably between 15000 and 50000, and in particular between 20000 and 50000. These liquid polyisoprenes provide the necessary elasticity and high strength of the cured rubber compositions.

The compositions furthermore include at least one functionalized, liquid polybutadiene, in particular 1,4- and/or 1,2-polybutadiene, wherein the polymers comprise terminal and/or (statistically distributed) side-chain functionalized groups. Examples of such functional groups are hydroxy, amino, carboxyl, carboxylic acid anhydride or epoxy groups, in particular carboxy groups. The molecular weight of these liquid rubbers is typically below 20000, and preferably between 900 and 10000.

It has been found to be expedient to preferably use mixtures of liquid rubbers having differing molecular weights and differing configurations with respect to the remaining double bonds. So as to achieve optimal adhesion to the diverse substrates, a liquid rubber component comprising hydroxyl groups or carboxyl groups is used in the particularly preferred formulations in a certain proportion.

The content of synthetic polymers having at least one C═C double bond and/or at least one C≡C triple bond in the composition is at least 7.5 wt. %, and preferably 9 wt. %, based on the total composition. The synthetic polymers mentioned here shall be understood to mean all synthetically produced polymers that include at least one C═C double bond and/or at least one C≡C triple bond. Examples of such synthetic polymers can be derived from the following group of homopolymers and/or co-polymers:
- polybutadienes, in particular the 1,4- and 1,2-polybutadienes;
- polybutenes;
- polyisobutylenes;
- styrene-butadiene copolymers; and
- butadiene acrylonitrile copolymers.

The heat-curable compositions according to the invention contain at least one triglyceride fraction, the fatty acid distribution of which includes at least 5 wt. %, in particular at least 10 wt. %, and especially particularly preferably at least 60 wt. % of one or more omega-3 fatty acid(s) and/or one or more omega-6 fatty acids. The triglyceride fraction is preferably liquid, and particularly preferably it is at least one vegetable oil.

A "triglyceride fraction" according to the invention shall be understood to mean the sum of all triglycerides present in the composition, which is to say the triple esters of glycerol containing three fatty acid molecules. For determining the triglyceride fraction, it does not matter which raw material was used to produce the triglycerides.

According to the invention, the fatty acid distribution of a triglyceride fraction indicates the percent by weight of the different fatty acids based on the total mass of the fatty acids in the triglyceride fraction; the different percentages are usually determined by way of gas chromatography after the fatty acids have been released as methyl esters. The mass of the glycerol accordingly is not included in this calculation.

Preferred omega-3 fatty acids according to the invention are hexadecatrienoic acid (16:3; ($\omega$-3)), alpha-linolenic acid (18:3 ($\omega$-3)), stearidonic acid (18:4; ($\omega$-3)), eicosatrienoic acid (20:3; ($\omega$-3)), eicosatetraenoic acid (20:4; ($\omega$-3)), eicosapentaenoic acid (20:5; ($\omega$-3)), heneicosapentaenoic acid (21:5; ($\omega$-3)), docosapentaenoic acid (22:5; ($\omega$-3)), docosahexaenoic acid (22:6; ($\omega$-3)), tetracosapentaenoic acid (24:5; ($\omega$-3)), and tetracosahexaenoic acid (24:6; ($\omega$-3)). Particularly preferred omega-3 fatty acids according to the invention are alpha-linolenic acid (18:3 ($\omega$-3)) and eicosapentaenoic acid (20:5; ($\omega$-3)). Alpha-linolenic acid (18:3 ($\omega$-3)) is an especially particularly preferred omega-3 fatty acid according to the invention.

Preferred omega-6 fatty acids according to the invention are linoleic acid (18:2; ($\omega$-6)), gamma-linolenic acid (18:3; ($\omega$-6)), calendic acid (18:3; ($\omega$-6)), eicosadienoic acid (20:2; ($\omega$-6)), dihomo-gamma-linolenic acid (20:3; ($\omega$-6)), arachidonic acid (20:4; ($\omega$-6)), docosadienic acid (22:2; ($\omega$-6)), docosatetraenoic acid (22:4; ($\omega$-6)), docosapentaenoic acid (22:5; ($\omega$-6)), tetracosatetraenoic acid (24:4; ($\omega$-6)) and tetracosapentaenoic acid (24:5; ($\omega$-6)). Especially particularly preferred omega-6 fatty acids according to the invention are linoleic acid (18:2; ($\omega$-6)), gamma-linolenic acid (18:3; ($\omega$-6)) and arachidonic acid (20:4; ($\omega$-6)). Linoleic acid (18:2 ($\omega$-6)) is an especially particularly preferred omega-6 fatty acid according to the invention.

Particularly good mechanical properties were able to be achieved when the triglyceride fraction has a fatty acid distribution that includes at least 4 wt. %, and in particular at least 20 wt. % of one or more omega-3 fatty acids.

It has proven advantageous according to the invention if at least 40 wt. %, in particular 60 wt. %, and especially particularly 100 wt. % of the triglyceride fraction is liquid at 25° C., which is to say present in the form of an oil.

It has furthermore proven advantageous if the triglyceride fraction including the contents of omega-3 fatty acids and/or omega-6 fatty acids according to the invention stem from a natural source, for example appropriate vegetable and/or animal oils. While vegetable oils are particularly preferred according to the invention, a use of animal oils, such as fish oil or cod liver oil, is also covered according to the invention.

Triglyceride fractions according to the invention are present, for example, in sunflower oil, rapeseed oil, soy bean oil, tall oil, castor oil, camelina oil, tung oil, linseed oil and/or hempseed oil. The triglyceride fraction is thus preferably used in the form of sunflower oil, rapeseed oil, soy bean oil, tall oil, castor oil, camelina oil, tung oil, linseed oil, hempseed oil and mixtures thereof, in particular tall oil, linseed oil, hempseed oil and/or castor oil, and particularly preferably linseed oil and hempseed oil. The use of linseed oil is especially particularly preferred, and more particularly refined linseed oil. The use of a combination of two, three or more suitable oils, such as sunflower oil and rapeseed oil;
sunflower oil and soy bean oil;
sunflower oil and tall oil;
sunflower oil and camelina oil;
sunflower oil and tung oil;
sunflower oil and linseed oil;
sunflower oil and hempseed oil;
rapeseed oil and soy bean oil;
rapeseed oil and tall oil;
rapeseed oil and camelina oil;
rapeseed oil and tung oil;
rapeseed oil and linseed oil;
rapeseed oil and hempseed oil;
soy bean oil and tall oil;
soy bean oil and camelina oil;
soy bean oil and tung oil;
soy bean oil and linseed oil;
soy bean oil and hempseed oil;
tall oil and camelina oil;
tall oil and tung oil;
tall oil and linseed oil;
tall oil and hempseed oil;
camelina oil and tung oil;
camelina oil and linseed oil;
camelina oil and hempseed oil;
tung oil and linseed oil;
tung oil and hempseed oil; or
linseed oil and hempseed oil
is also covered by the present invention.

In various embodiments, the described triglyceride fractions account for at least 50 wt. %, preferably at least 70 wt. %, still more preferably at least 90 wt. %, and most preferably 100 wt. % of the oils used.

The triglyceride fraction, or the oil containing the triglyceride fraction, is preferably present in the heat-curable compositions according to the invention in an amount of 1 to 40 wt. %, and in particular 1 to 15 wt. %, based on the total composition.

The heat-curable compositions according to the invention contain at least one vulcanizing agent as a further component. The cross-linking or curing reaction of the rubber composition has a decisive influence on the sealing function, on the coating, and on the reinforcing effect or strength of the component, and the vulcanizing system, and optionally the blowing agent composition, must therefore be selected and matched particularly carefully. In various embodiments, the vulcanizing agent is selected from vulcanizing systems that are based on elemental sulfur, thiuram disulfides, organic peroxides, polyfunctional amines, quinones, quinone dioximes, such as p-benzoquinone dioxime, and nitrosobenzenes, such as p-nitrosobenzene and dinitrosobenzene. In preferred embodiments, the vulcanizing agent is selected from the group consisting of:
(I) sulfur;
(II) peroxidic vulcanizing systems;
(III) quinones and/or quinone dioximes and/or
(IV) dinitrosobenzenes.

In a first preferred embodiment, synthetic or natural sulfur is used as the vulcanizing agent. According to the invention, preferably powdery sulfur is used; however, to avoid dust pollution in production, it may also be preferred to use sulfur in a blend with a dust-binding agent, for example mixed with mineral oil, paraffin oil or silicon dioxide. It is quite possible for the content of the dust-binding oils to be selected such that a sulfurous paste is used as the raw material. Sulfur is preferably used in the $S_8$ configuration.

The active substance content of sulfur in the compositions according to the invention may vary within wide limits, and may be up to 20 wt. %, preferably up to 15 wt. %, and in particular up to 10 wt. %, in each case based on the total heat-curable composition; the lower limit should preferably be no less than 0.5 wt. %. In various embodiments, powdery sulfur may be used in amounts of 4 to 15 wt. %, based on the total composition, and particularly preferably amounts between 5 and 8% are used. The content of sulfur depends on the reactivity of the liquid rubbers used, and optionally the use of polymerization additives.

In a second preferred embodiment, radical vulcanizing agents, based on organic or inorganic peroxides, are used. Examples of preferred peroxides according to the invention are diacetyl peroxide, di-tert-butyl peroxide, dicumyl peroxide and dibenzoyl peroxide. The peroxides are present as vulcanizing agents in the compositions according to the invention in amounts of 0.2 wt. % to 3 wt. %.

In a third preferred embodiment, quinones and/or quinone dioximes are used as vulcanizing agents. A particularly preferred representative of this group is p-benzoquinone dioxime. The quinones and/or quinone dioximes are preferably used in the compositions according to the invention in concentrations of 0.2 wt. % to 5 wt. %. These quinone-based vulcanizing agents are preferably used in densitized form as a paste, for example in a blend with mineral oils, wherein the active substance content is usually between 40 wt. % and 70 wt. %.

In a fourth preferred embodiment, dinitrosobenzenes, and in particular 1, 4-dinitrosobenzene, are used as the vulcanizing agent. This substance group is preferably used in the compositions according to the invention in a concentration of 0.2 wt. % to 5 wt. %, in each case based on the total heat-curable composition.

Sulfur is an especially particularly preferred vulcanizing agent.

Regardless of the specific embodiment, it has proven advantageous to use the vulcanizing agent in combination with
  organic curing accelerators, such as dithiocarbamates (in the form of the ammonium or metal salts thereof), xanthogenates, sulfenamides, thiuram compounds (monosulfides and disulfides), thiazole compounds, aldehyde/amine accelerators (such as hexamethylene tetramine), dithiophosphate and guanidine accelerators, with dibenzothiazyl disulfide (MBTS), 2-mercaptobenzothiazole (MBT), the zinc salt thereof (ZMBT) or diphenylguanidine being especially particularly preferred; and/or Metal oxides, such as zinc oxide.

In addition, typical rubber vulcanizing auxiliary agents such as fatty acids (for example stearic acid) may be present in the formulation.

According to the invention, particularly advantageous vulcanization properties and end properties of the cured rubber compositions are achieved when a combined vulcanizing system comprising elemental sulfur, the above-mentioned organic accelerators and quinone dioximes is used. By way of example p-benzoquinone dioximes shall be mentioned; however, other quinone dioximes in combination with the aforementioned sulfur systems may also be used.

Organic accelerators are used in amounts between 0 and 10 wt. %, based on the total formulation, and preferably in amounts between 3 and 8 wt. %.

The zinc compounds acting as accelerators may be selected from the zinc salts of fatty acids, zinc dithiocarbamates, alkaline zinc carbonates, and in particular fine particled zinc oxide. The content of zinc compounds is in the range between 0 and 10 wt. %, and preferably between 3 and 7 wt. %.

The compositions described herein can furthermore comprise additional components selected from fillers, including rheology auxiliaries, pigments, tackifiers and/or adhesion promoters, blowing agents, extender oils, anti-aging agents and combinations thereof.

In particular organic fillers are preferred fillers. The first group of inorganic fillers includes, for example, the various ground or precipitated chalks, calcium magnesium carbonates, calcium oxide, barite, and in particular siliceous fillers of the aluminum magnesium calcium silicate type, for example wollastonite or chlorite, or aluminum borosilicate glasses Chalks are preferred inorganic fillers according to the invention; ground mineral chalks are especially particularly preferred. Moreover, calcium oxide is a particularly preferred inorganic filler within the meaning of the present invention. The content of calcium carbonate and/or calcium oxide can preferably vary between 5 wt. % and approximately 50 wt. %, based on the total heat-curable composition. In the case of calcium oxide, concentrations between 0 and approximately 10 wt. % are customary, based on the total heat-curable composition.

In some circumstances, it may be expedient for at least a portion of the inorganic fillers to be surface-pretreated; in particular, a coating with at least one fatty acid, and in particular with stearic acid, has proven expedient for the various calcium carbonates and chalks.

A second group of inorganic fillers that may be used in the heat-curable compositions are flaky fillers. Heat-curable compositions containing at least one flaky filler, such as graphite, vermiculite, mica, talc or similar phyllosilicates, are particularly preferred. Graphite is a particularly preferred flaky filler within the meaning of the present invention. The flaky fillers are preferably used when a positive influence on the sound properties is desired. The content of flaky fillers can preferably be between 5 wt. % to 30 wt. %.

A third group of preferred inorganic fillers according to the invention are rheology additives or rheology auxiliaries, which can have an influence on the rheology and/or strength of the compositions. While the rheology of the compositions according to the invention can also be brought into the desired range by way of the selection of the above-mentioned fillers and the proportion of the low-molecular-weight liquid rubbers, conventional rheology auxiliaries, such as fumed silicas, bentones, or fibrillated or pulp short fibers, may be added in the range between 0.1 and 7%, or else hydrogenated castor oil derivatives, known under the trade name Rilanit (Cognis), for example. According to the invention, the rheology additives are preferably selected from silicon dioxide and/or carbon black. According to the invention, the term "silicon dioxide" also encompasses the oxide forms of silicon known as silica.

It may be preferred according to the invention for the compositions to contain at least one surface-modified silicon dioxide; hydrophilically modified silicon dioxides have particularly advantageous properties as the surface-modified silicon dioxide.

Surface-modified silicon dioxide types having a specific surface area of at least 100 $m^2/g$, in particular at least 150 $m^2/g$ (measured in each case according to the BET method) are particularly preferred according to the invention.

According to the invention, carbon black shall be understood to mean preferably industrially manufactured carbon black.

A content of 0 to 5 wt. %, in particular 0.1 to 4 wt. %, especially particularly 0.5 to 3 wt. % of a rheology additive, preferably selected from silicon dioxide and/or carbon black, based on the total heat-curable composition, is particularly preferred.

It is preferred according to the invention for the heat-curable compositions to contain a combination of two or more inorganic fillers. In particular, a combination of
  at least one inorganic filler selected from calcium carbonate and/or calcium oxide and
  at least one rheology additive
Is particularly preferred according to the invention.

An especially particularly preferred filler combination according to the invention is the following combination: Calcium oxide, calcium carbonate and silica or carbon black.

The inorganic fillers are preferably used in an amount of 1 to 40 wt. %, and in particular of 10 to 35 wt. %, in each case based on the mass of the total heat-curable composition.

In addition to the aforementioned "normal" inorganic fillers, the compositions according to the invention may also include what are known as lightweight fillers. According to the invention, a lightweight filler shall be understood to mean a filler having a lower density than the remainder of the composition. The addition of such lightweight fillers accordingly reduces the overall density of the composition. Lightweight fillers are preferably selected from the group of hollow glass spheres, fly ash (fillite), hollow plastic spheres, for example based on phenolic resins, epoxy resins or polyesters, hollow ceramic spheres or organic lightweight fillers of natural origin, such as ground nut shells, for example the shells of cashew nuts, coconuts or peanut shells, as well as ground cork or coke powder. Lightweight fillers based on hollow microspheres are particularly preferred; these may be the aforementioned hollow glass spheres, or else the expandable or expanded hollow plastic microspheres based on polyvinylidene copolymers or acrylonitrile copolymers, the latter being commercially available under the names "Dualite" and "Expancel" from Pierce & Stevens and Akzo Nobel, respectively.

Lightweight fillers are preferably present in the heat-curable compositions in an amount of 0.1 to 15 wt. %, and in particular of 0.4 to 7 wt. %, based on the total heat-curable composition.

The overall content of fillers in the heat-curable formulations may vary between 10 and 70 wt. %, the preferred range being between 25 and 60 wt. %.

In some embodiments, the heat-curable compositions may include at least one further synthetic, liquid polymer, which comprises at least one C=C double bond and/or at least one C≡C triple bond, in addition the aforementioned polymers. The at least one further synthetic, liquid polymer is preferably present in an amount of 1 to 20 wt. %, and in particular 3 to 15 wt. %, based on the total composition. These polymers are preferably selected from the following group of homopolymers and/or copolymers:
  polybutadienes, in particular the 1,4- and 1,2-polybutadienes;
  polybutenes;
  polyisobutylenes;
  styrene-butadiene copolymers; and
  Butadiene acrylonitrile copolymers.
The heat-curable compositions preferably additionally comprise at least one further liquid polybutadiene, and in particular a 1,4- and/or 1,2-polybutadiene. The at least one further liquid polybutadiene preferably has a molecular weight between 900 and 10000, and preferably between 2000 and 5000. Adding a polybutadiene advantageously affects the elasticity of the resulting products.

Furthermore, so as to achieve foaming during the curing process, the heat-curable compositions of the invention can, in principle, comprise all common blowing agents; however, preferably organic blowing agents from the class of the azo compounds, N-nitroso compounds, sulfonyl hydrazides or sulfonyl semicarbazides are used. For the azo compounds to be used according to the invention, azobisisobutyronitrile, and in particular azodicarbonamide shall be mentioned by way of example; from the class of nitroso compounds, dinitrosopentamethylene tetramine shall be mentioned by way of example; from the class of sulfohydrazides, 4,4'-oxybis(benzenesulfonic acid hydrazide), diphenylsulfone-3,3'-disulfohydrazide or benzene-1,3-disulfohydrazide shall be mentioned, and from the class of semicarbazides, p-toluenesulfonyl semicarbazide shall be mentioned.

Instead of the aforementioned blowing agents, it is also possible to use what are known as expandable microspheres, which is to say non-expanded thermoplastic polymer powders saturated or filled with organic liquids having a low boiling point. Such microspheres are described in EP-A-559254, EP-A-586541 or EP-A-594598, for example. Although they are not preferred, the use or co-use of already expanded microspheres is also possible. Optionally, these expandable/expanded microspheres may be combined at any arbitrary ratio with the above-mentioned "chemical" blowing agents. The chemical blowing agents could be used in foamable compositions in amounts between 0.1 and 3 wt. %, and preferably between 0.2 and 2 wt. %, and the microspheres could be used in amounts between 0.1 and 4 wt. %, and preferably between 0.2 and 2 wt. %.

In a preferred subject matter, the compositions are compact systems, and not foamable compositions. Compact systems preferably have a maximum expansion after the reaction, which is preferably less than 10% based on the starting volume. The expansion describes the increase in volume during the reaction of the composition, wherein the volume of the composition used is compared to the volume of the completely reacted composition. The compositions preferably do not comprise any chemical blowing agents.

In a further embodiment, it is preferred for the heat-curable compositions according to the invention to furthermore contain at least one antioxidant. These can offer protection against the thermal, thermo-oxidative or ozone-related degradation of the compositions according to the invention.

Conventional synthetic antioxidants are suitable according to the invention, such as sterically hindered phenols or amine derivatives. Examples of synthetic antioxidants are the products that are commercially available under the trade name Wingstay® and 2,2-methylenebis(4-methyl-6-tert-butylphenol) and 2,6-di-tert-butyl-p-cresol (3,5-di-tert-butyl-4-hydroxytoluene).

In addition, natural antioxidants are also suitable according to the invention. A natural antioxidant shall be understood to mean a compound that can be obtained from naturally renewable resources. Examples of this substance group are tocopherol, squalene and sesamolin.

The antioxidants, in particular the natural antioxidants, are preferably used in the heat-curable compositions according to the invention in amounts of 0.1 to 5 wt. %, and in particular 0.2 to 3 wt. %, in each case based on the total heat-curable composition.

The heat-curable compositions according to the invention can furthermore contain typical components for this type of composition.

Although the compositions according to the invention in general already have excellent adhesion to the substrates due to the preferred content of liquid rubber comprising functional groups, tackifiers and/or adhesion promoters may be added if necessary. Hydrocarbon resins, phenolic resins, terpene phenolic resins, resorcinol resins or the derivatives thereof, modified or unmodified resin acids or rosin esters (abietic acid derivatives), polyamines, polyaminoamides, polyepoxy resins, anhydrides and anhydride group-containing copolymers are suitable for this purpose, for example. The type and amount of tackifiers or of the adhesion promoters is dependent on the polymer composition of the adhesive/sealant and the coating composition, on the strength of the cured composition, and on the substrate to which the composition is applied. Typical tackifying resins (tackifiers) such as the terpene phenolic resins or resin acid derivatives are normally used in concentrations between 5 and 20 wt. %; typical adhesion promoters such as polyamines, polyaminoamides or resorcinol derivatives are used in the range between 0.1 and 10 wt. %.

The compositions according to the invention are free of plasticizers, and in particular phthalic acid esters. The compositions are preferably free of solvents, and in particular free of plasticizers and solvents. The compositions are preferably also free of extender oils.

The compositions according to the invention may optionally also contain finely distributed thermoplastic polymer powers. Examples of suitable thermoplastic polymers are polypropylene, polyethylene, thermoplastic polyurethanes, methacrylate copolymers, styrene copolymers, polyvinyl chloride, polyvinyl acetate, and in particular polyvinyl acetate and the copolymers thereof, such as ethylene-vinyl acetate copolymers. While the particle size or particle size distribution of the polymer powders does not appear to be particularly critical, the average particle size should be less than 1 mm, and preferably less than 350 µm. The amount of the optionally added thermoplastic polymer powder ranges between 0 and 20 wt. %, and preferably between 2 and 10 wt. %.

Compared to the related art, the compositions according to the invention have rheological properties that are very similar to those of plastisols, without having the aforementioned disadvantageous properties of the same. This means that they have the good processing properties with respect to the rheology of conventional plastisols, while also having the excellent aging stability and strength values of conventional vulcanizable (curable) rubber compositions. For this reason, these could also be referred to as "rubber plasticols," although the makeup of the same does not correspond to those of typical plastisols.

If the heat-curable compositions according to the invention are to be used in particular as coating compounds, it has proven preferred according to the invention for these to have a viscosity at 20° C. of 1000 mPa·s to 100,000 mPa·s, measured in accordance with DIN 53019, prior to curing. Specific preferred ranges for the viscosity of heat-curable compositions are:

at 20° C.: 15,000 mPa·s to 80,000 mPa·s, and
at 40° C.: 5,000 mPa·s to 20,000 mPa·s.

If the heat-curable compositions according to the invention are to be used as adhesives and sealants, sealing compounds or as lining adhesives, it has proven preferred according to the invention for these to have the following viscosities, measured in accordance with DIN 53019, prior to curing:

at 20° C.: 150,000 mPa·s to 400,000 mPa·s; and
at 40° C.: 100,000 mPa·s to 200,000 mPa·s.

The heat-curable compositions according to the invention can be produced by mixing the selected components in any arbitrary, suitable mixer, such as a dispersion mixer, a planetary mixer, a kneading machine, a twin-screw mixer, a continuous mixer, an internal mixer, a so-called "Banbury" mixer or an extruder, and similar mixing units known to a person skilled in the art, and in particular a twin-screw extruder.

Regardless of which tool is selected, it may optionally be advantageous to allow slight heating of the composition, or to slightly heat the composition, so as to make it easier to achieve a homogeneous, uniform mass; however, it is essential to ensure that no temperatures are reached that would bring about an activation of the vulcanization reaction.

The present invention accordingly further relates to the production of the heat-curable composition according to the invention by mixing the components under high shear.

The compositions according to the invention are preferably stored until use in vessels having a capacity of 1000 liters (containers), 200 liters (drums), 20 to 50 liters (hobbocks), tank cars or day tanks (20,000 liters) for large-scale applications, and in cartridges having a capacity of 310 to 500 ml in particular for manual application.

At the time of use, the heat-curable composition according to the invention is transported from the storage vessel to the place of use by way of conventional, optionally heated, pumps and is applied there. The compositions according to the invention are characterized by being able to be applied by way of spray techniques. In particular, applying the compositions to the substrate by way of airless, air-assisted or AirMix spraying methods or flat-stream methods is particularly preferred according to the invention. Applying the compositions according to the invention by way of a flat-stream method is especially particularly preferred according to the invention.

Atomizing spraying methods or non-atomizing spraying methods can be used for an application in the preferred high-pressure spraying method. Atomization of the composition material for application is possible under the material pressure alone when using the airless method, or with additional air support in the air-assisted or AirMix spraying method. Non-atomizing application methods, such as the flat-stream method or electro-swirl method, are particularly preferred used according to the invention for applying the composition. In both of these methods, the final layer thickness of the composition can be applied to the substrate in just one application movement at high application rates of >100 mm/s in layer thicknesses of up to 5 mm.

An application of the compositions according to the invention by way of one of the two aforementioned non-atomizing application methods, these being flat-stream and electro-swirl, is characterized by a sharp-edged material application onto the substrate with no overspray, which is to say without contaminating the substrate adjacent to the application site with spray mist, by low spraying pressures in the range of 60 to 180 bar, and by a very high repeatability in the case of multiple series applications.

In general, the applied heat-curable composition is cured by way of heating, wherein the composition is heated for a certain time to a temperature sufficient to bring about the vulcanization reaction. It is preferred according to the invention for the vulcanization reaction to be completed within this heating time; however, methods having short oven cycle times and post-crosslinking in downstream ovens, and in individual cases even post-crosslinking after the time in the oven, are also possible.

Depending on the makeup of the composition and the conditions of the production line, such temperatures are usually in the range of 150° C. to 230° C. for body-in-white lines, and preferably 160° C. to 185° C., with a residence time of 10 to 90 minutes, and preferably 15 to 30 minutes. For paint lines the temperatures are 120° C. to 175° C., and preferably 130° C. to 160° C., with a residence time of 5 to 60 minutes, and preferably 10 to 30 minutes.

The nature of the heat source is unimportant in principle, so the heat can be supplied by a hot air blower, by way of irradiation with microwaves or infrared radiation, by magnetic induction or by heating tongs, for example. In vehicle construction and in technology fields using related manufacturing processes, it is particularly advantageous for curing of the compositions according to the invention to take place as the vehicle passes through the oven for curing the cathodic dip coating or for stoving the paint coatings, so that a separate heating step can be dispensed with.

For the curing reaction, and optionally the foaming reaction, of the compositions, the process temperatures of the various painting ovens are then available, which is to say a temperature range between 80° C. and 240° C. for approximately 10 to 35 minutes, and preferably the auto body or the pads passing through what is known as an "EC oven" is used to cure the compositions according to the invention, which is to say temperatures between 160° C. and 200° C.

In the manufacturing sequence, it may also be useful if pre-gelling or partial curing takes place after the composition according to the invention has been applied and the components have been joined. All pre-gelling devices that are known per se, such as pre-gelling ovens or induction heating systems, may be used for this purpose. A typical temperature range for the pre-gelling step is between 100° C. and 160° C. In particular with induction heating, only very brief heating in the range of a few seconds is necessary, wherein the substrate temperature may be as much as 190° C. and briefly may be significantly higher than that.

A further aspect of the invention is the use of the compositions according to the invention as a one-component, optionally sound-damping, sealing compound or coating compound, in particular in the automotive paint field.

The main field of application for the heat-curing reactive compositions according to the invention is paint shops in the automotive industry, where the parts, which later form the sheet metal overlaps of the auto body or which later form the joints, are easily accessible, so that the application of low-viscosity, pasty materials can be carried out using conventional pumping, metering, spraying or extrusion devices. The preferred fields of application for the compositions according to the invention are the sealing of joints and underbody protection. What was said above for the preceding subject matter applies, mutatis mutandis, to the further details of this subject matter of the present invention.

The present invention further relates to a method, in particular in a vehicle body-in-white, for joining components and/or for sealing joints between components, in particular for sealing coarse and/or fine seams or for lining or bonding components, wherein:
 a) a composition according to the invention is applied to at least one component, and in particular to the surface of such a component, preferably by way of spraying or extrusion;
 b) the components to be connected are joined, optionally followed by (spot) welding, flanging, bolting and/or riveting; and
 c) the components are heated so as to cure the composition, optionally with mechanical fixation of the components.

The components are preferably metal parts.

The curing step can include multiple individual or additional steps, such as the partial curing of the composition, for example by briefly heating the parts to temperatures of up to 190°, prior to the actual curing step, and optionally one or more steps for cleaning/washing the joined body-in-white parts, optionally followed by customary surface pretreatment steps. The actual curing step may include electro dip-coating, curing and/or cross-linking of the sealing compound during stoving of the electro dip-coating at temperatures between 160° C. and 240° C.

The present invention moreover relates to a method for coating components, the method comprising:
 c) spraying a composition according to the invention on the surface of the component; and
 d) heating the coated component so as to cure the composition.

What was said above for the preceding subject matter applies, mutatis mutandis, to the further details of this subject matter of the present invention.

The invention furthermore relates to a method for coating components by spraying a composition according to the invention on the surface of the part and heating the coated part so as to cure the composition.

Also covered according to the invention is a method for sound-damping components, in which at least one surface of the component is coated with a composition according to the invention, and the coated component is heated so as to cure the composition.

It is preferred according to the invention for the coating of the component to take place by spraying on the composition according to the invention.

Applying the composition according to the invention improves the sound properties of the component.

It has proven particularly advantageous within the scope of this subject matter of the present invention for the spraying of the composition according to the invention onto the substrate to be carried out by way of an airless, air-assisted, or AirMix method, a flat-stream method, or a swirl method.

What was said above for the preceding subject matter also applies, mutatis mutandis, to the further details of this subject matter of the present invention.

The following exemplary embodiments are intended to describe the invention in greater detail, wherein the selection of the example is not intended to limit the scope of the subject matter of the invention.

EXAMPLES

Composition 1

| Component | Amount |
| --- | --- |
| Calcium oxide | 2.00 |
| 4-methylphenol reaction product with dicyclopentadiene and isobutylene | 0.25 |
| Calcium carbonate, coated with stearate | 13.77 |
| Precipitated calcium carbonate | 34.59 |
| Sulfur | 6.50 |
| Silica | 1.69 |
| Zinc dibenzyldithiocarbamate | 0.80 |
| Zinc mercaptobenzothiaole | 0.90 |
| Hollow glass spheres | 1.00 |
| Refined linseed oil | 21.50 |
| Liquid 1,3-polybutadiene Mw approx. 2600 g/mol | 10.00 |
| Liquid polybutadiene with active carboxyl groups Mw approx. 1700 g/mol | 3.00 |
| Cis-1,4-polyisoprene Mw approx. 28000 g/mol | 4.00 |

Composition 2

| Component | Amount |
|---|---|
| Calcium oxide | 4.00 |
| 4-methylphenol reaction product with dicyclopentadiene and isobutylene | 0.50 |
| Calcium carbonate, coated with stearate | 16.00 |
| Precipitated calcium carbonate | 24.38 |
| Sulfur | 8.00 |
| Silica | 1.00 |
| Zinc dibenzyldithiocarbamate | 1.20 |
| Zinc mercaptobenzothiaole | 0.90 |
| Refined linseed oil | 14.00 |
| Liquid polybutadiene with active carboxyl groups Mw approx. 1700 g/mol | 0.50 |
| Cis-1,4-polyisoprene Mw approx. 28000 g/mol | 12.00 |
| Zinc oxide active | 2.00 |
| Carbon black | 0.05 |
| Castor oil | 6.00 |
| Tall oil distillate | 10.00 |

Composition 3

| Component | Amount |
|---|---|
| Calcium oxide | 4.00 |
| Titanium dioxide | 0.50 |
| Calcium carbonate, coated with stearate | 16.50 |
| Precipitated calcium carbonate | 31.65 |
| Sulfur | 5.00 |
| Zinc dibenzyldithiocarbamate | 2.20 |
| Zinc mercaptobenzothiaole | 0.90 |
| Refined linseed oil | 25.40 |
| Liquid polybutadiene with active carboxyl groups Mw approx. 1700 g/mol | 5.00 |
| Cis-1,4-polyisoprene Mw approx. 54000 g/mol | 4.80 |
| Zinc oxide active | 3.00 |
| Carbon black | 0.05 |
| Stearic acid | 1.00 |

Composition 4

| Component | Amount |
|---|---|
| Calcium oxide | 4.00 |
| Titanium dioxide | 0.25 |
| Calcium carbonate, coated with stearate | 12.33 |
| Precipitated calcium carbonate | 27.10 |
| Sulfur | 6.00 |
| Zinc dithiophosphate | 4.00 |
| Zinc mercaptobenzothiaole | 0.60 |
| Linseed oil | 25.00 |
| Liquid polybutadiene with active carboxyl groups Mw approx. 1700 g/mol | 2.00 |
| Cis-1,4-polyisoprene Mw approx. 15000 g/mol | 10.00 |
| Zinc oxide | 0.50 |
| Liquid 1,3-polybutadiene Mw approx. 1000 g/mol | 4.80 |
| Hollow glass spheres | 3.10 |
| Carbon black | 0.12 |
| Stearic acid | 0.20 |

Measurement Results

Determining the Shore A Hardness

The exemplary compositions were cured for 20 minutes at 150° C. for determining the Shore A hardness. Thereafter samples having a material thickness of 5 mm were removed and the Shore A hardness was determined at room temperature. The measured values are compiled in Table 1.

Determining the Tensile Strength at Break and Elongation at Break

The tensile strength at break and elongation at break were determined in accordance with DIN 53504. For this purpose, Teflon spacers having a thickness of 2 to 3 mm were used to produce the S2 shouldered test bars, and the uncured material was pressed between two plates covered with silicone release paper. After curing (20 minutes at 150°), the test specimens were stamped out for the measurement in accordance with DIN 53504.

TABLE 1

| Composition | 1 | 2 | 3 | 4 |
|---|---|---|---|---|
| Tensile strength at break in MPa | 1.45 | 0.87 | 1.22 | 0.65 |
| Elongation at break in % | 35.2 | 54.3 | 45.1 | 61.4 |
| Shore A hardness in SKT | 54.3 | 44.7 | 50.6 | 41.5 |

Stoving cycle: 20 minutes 150° C. object temperature

The invention claimed is:

1. A heat-curable reactive composition including natural and/or synthetic elastomers containing olefinic double bonds, comprising:
    (a) at least one liquid polyisoprene in an amount of 1 to 25 wt. % based on the total composition;
    (b) at least one functionalized liquid polybutadiene in an amount of 0.1 to 10 wt. % based on the total composition;
    (c) a triglyceride fraction, the fatty acid distribution of which includes at least 5 wt. % of one or more omega-3 fatty acid(s) and/or one or more omega-6 fatty acids, and the triglyceride fraction is present in an amount of 1 to 40 wt. % based on the total composition; and
    (d) at least one vulcanizing agent;
wherein the content of synthetic polymers having at least one C=C double bond and/or at least one C≡C triple bond is at least 7.5 wt. % based on the total composition; and
wherein the heat-curable reactive composition is a liquid.

2. The composition according to claim 1, wherein the at least one liquid polyisoprene is cis-1,4-polyisoprene.

3. The composition according to claim 1, wherein the at least one liquid polyisoprene is present in an amount of 1 to 15 wt. %, based on the total composition.

4. The composition according to claim 1, wherein the at least one functionalized liquid polybutadiene is present in an amount of 0.5 to 5 wt. %, based on the total composition.

5. The composition according to claim 1, wherein the triglyceride fraction has the fatty acid distribution which includes at least 60 wt. %, of one or more omega-3 fatty acid(s) and/or one or more omega-6 fatty acids.

6. The composition according to claim 1, wherein the triglyceride fraction is present in an amount of 1 to 25 wt. %, based on the total composition.

7. The composition according to claim 1, wherein the content of synthetic polymers having at least one C=C double bond and/or at least one C≡C triple bond is at least 9wt. %, based on the total composition.

8. The composition according to claim 1, wherein the at least one liquid polyisoprene comprises one or more liquid cis-1,4-polyisoprenes having a weight average molecular weight between 10000 and 70000.

9. The composition according to claim 1, wherein the at least one liquid polyisoprene comprises one or more liquid cis-1,4-polyisoprenes having a weight average molecular weight between 15000 and 50000.

10. The composition according to claim 1, wherein the at least one functionalized liquid polybutadiene includes 1,4- and/or 1,2-polybutdiene, wherein these polymers comprise terminal and/or statistically distributed side-chain functionalized groups, wherein the functional groups are selected from hydroxy, amino, carboxy, carboxylic acid anhydride and epoxy groups, and wherein a weight average molecular weight of these liquid rubbers is between 900 and 20000.

11. The composition according to claim 1, wherein the triglyceride fraction comprises a vegetable oil selected from sunflower oil, rapeseed oil, soy bean oil, tall oil, castor oil, camelina oil, tung oil, linseed oil, hempseed oil and mixtures thereof.

12. The composition according to claim 1, wherein the triglyceride fraction is a vegetable oil selected from tall oil, linseed oil, hempseed oil, castor oil and mixtures thereof.

13. The composition according to claim 1, wherein the at least one vulcanizing agent is selected from sulfur, peroxidic vulcanizing systems, quinones, quinone dioximes, dinitrosobenzenes and mixtures thereof.

14. The composition according to claim 1, further comprising filler, rheology auxiliary, pigment, tackifier, adhesion promoter, blowing agent, extender oil, anti-aging agent and combinations thereof.

15. The composition according to claim 1, wherein the composition: (a) is free of solid rubbers; and/or (b) has plastisol-like rheological properties.

16. Cured products of the composition according to claim 1.

17. A one-component or two-component adhesive, sealant, sealing compound or coating compound comprising the composition according to claim 1.

18. A method for joining components and/or for sealing joints between components, comprising:
   a) applying the composition according to claim 1 to at least a first component;
   b) joining the first component to a second component, optionally followed by welding, flanging, bolting and/or riveting the first and second components; and
   c) heating the first and second components to cure the composition, optionally with mechanical fixation of the components during the heating.

19. The method of claim 18 wherein the step of applying the composition consists of spraying or extruding the composition onto the at least first component.

20. A method for coating a component, comprising: a) spraying a composition according to claim 1 on the surface of a component; and b) heating the coated component so as to cure the composition.

* * * * *

UNITED STATES PATENT AND TRADEMARK OFFICE
CERTIFICATE OF CORRECTION

PATENT NO. : 9,951,211 B2
APPLICATION NO. : 15/183953
DATED : April 24, 2018
INVENTOR(S) : Ralf Sauer, Peter Born and Karin Weidenauer Page 1 of 1

It is certified that error appears in the above-identified patent and that said Letters Patent is hereby corrected as shown below:

In the Specification

Column 11, Line 44, change "rubber plasticols" to -- rubber plastisols --.

Column 13, Line 18, change "pads" to -- parts --.

In the Claims

Column 16, Line 62, change "1,2-polybutdiene" to -- 1,2-polybutadiene --.

Signed and Sealed this
Twenty-sixth Day of February, 2019

Andrei Iancu
*Director of the United States Patent and Trademark Office*